(12) United States Patent
Chen et al.

(10) Patent No.: US 8,990,262 B2
(45) Date of Patent: Mar. 24, 2015

(54) MANAGING DATA CENTER USING WEB SERVICES

(75) Inventors: Paul Ming Chen, Markham (CA); Michael George Polan, Markham (CA); Andrew Neil Trossman, North York (CA); Paul Darius Vytas, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1708 days.

(21) Appl. No.: 12/130,204

(22) Filed: May 30, 2008

(65) Prior Publication Data

US 2008/0228781 A1    Sep. 18, 2008

Related U.S. Application Data

(63) Continuation of application No. 10/870,345, filed on Jun. 17, 2004, now abandoned.

(51) Int. Cl.
*G06F 17/30* (2006.01)
*H04L 29/08* (2006.01)

(52) U.S. Cl.
CPC .................................. *H04L 67/025* (2013.01)
USPC ........................................................ 707/802

(58) Field of Classification Search
USPC ............ 709/223; 717/115; 719/313; 707/802
See application file for complete search history.

(56) References Cited

U.S. PATENT DOCUMENTS

| | | | |
|---|---|---|---|
| 5,410,691 | A | 4/1995 | Taylor |
| 5,706,501 | A | 1/1998 | Horikiri et al. |
| 6,353,846 | B1 | 3/2002 | Fleeson |
| 6,363,411 | B1 | 3/2002 | Dugan et al. |
| 6,714,946 | B1 | 3/2004 | Kanai et al. |
| 7,035,944 | B2 | 4/2006 | Fletcher et al. |
| 7,089,298 | B2 | 8/2006 | Nyman et al. |
| 7,152,046 | B2 | 12/2006 | Wang et al. |
| 7,174,379 | B2 | 2/2007 | Agarwal et al. |
| 7,313,619 | B2 | 12/2007 | Torrant et al. |

(Continued)

OTHER PUBLICATIONS

"Modeling Stateful Resource with Web Services", Jan. 2004 (updated Mar. 2004), pp. 1, http://www-106.ibm.com/developerworks/library/ws-resource/ws-modelingresources.html.

(Continued)

*Primary Examiner* — Huawen Peng
(74) *Attorney, Agent, or Firm* — Yee & Associates, P.C.; Jeffrey S. LaBaw

(57) ABSTRACT

Access of data center resources is provided by the present invention using stateless and stateful Web services. For stateless Web services, the present invention provides an invoker API that allows a client to invoke a specific resource and perform an operation on the resource. For stateful Web services, the present invention provides a Web Service Definition file that defines attributes and operations for data center resources. The client may access an instance of a Web service resource once an endpoint reference is obtained from the server. Since the resource instance is persistent, the client may invoke data center operations and manipulate the resource attributes accordingly.

35 Claims, 9 Drawing Sheets

(56) References Cited

U.S. PATENT DOCUMENTS

| | | |
|---|---|---|
| 2002/0059255 A1 | 5/2002 | Wu |
| 2002/0156613 A1 | 10/2002 | Geng et al. |
| 2002/0184349 A1 | 12/2002 | Manukyan |
| 2003/0018656 A1 | 1/2003 | Schutzman et al. |
| 2003/0023957 A1 | 1/2003 | Bau, III et al. |
| 2003/0028642 A1 | 2/2003 | Agarwal et al. |
| 2003/0101023 A1 | 5/2003 | Shah et al. |
| 2003/0105884 A1 | 6/2003 | Upton |
| 2003/0149685 A1 | 8/2003 | Trossman et al. |
| 2003/0195934 A1 | 10/2003 | Peterson et al. |
| 2003/0204612 A1 | 10/2003 | Warren |
| 2004/0010573 A1 | 1/2004 | Debaty et al. |
| 2004/0054690 A1 | 3/2004 | Hillerbrand et al. |
| 2004/0186906 A1 | 9/2004 | Torrant et al. |
| 2004/0199572 A1 | 10/2004 | Hunt et al. |
| 2004/0216127 A1 * | 10/2004 | Datta et al. .................... 719/313 |
| 2005/0044197 A1 | 2/2005 | Lai |
| 2005/0076344 A1 | 4/2005 | Goring et al. |
| 2005/0080855 A1 | 4/2005 | Murray |
| 2005/0080885 A1 | 4/2005 | Ahmed et al. |
| 2005/0132086 A1 | 6/2005 | Flurry et al. |
| 2005/0262237 A1 | 11/2005 | Fulton et al. |
| 2005/0278441 A1 | 12/2005 | Bond et al. |
| 2005/0283531 A1 | 12/2005 | Chen et al. |
| 2006/0069774 A1 | 3/2006 | Chen et al. |

OTHER PUBLICATIONS

Shaikh et al., "Implement and Access Stateful Web Services Using WebSphere Studio, Part1". Mar. 9, 2004, pp. 1-11, http://www-106.ibm.com/developerworks/webservices/library/ws-statefulws.html.

Shaikh et al., "Implement and Access Stateful Web Services Using WebSphere Studio, Part 1." http://www.ibm.com/developerworks/webservices/library/ws-statefulws.html., Mar. 9, 2004, pp. 1-11.

Short,"Building XML Web Services for the Microsoft.NET Platform", Microsoft Press, 2002, pp. 121-125.

Gralla, Preston, "Web services and the data center of tomorrow", <http:llsearchsoa.techtarget.comltipl0,289483,sid26gci924399,OO.html~, Aug. 9, 2003.

Office Action, dated Jun. 9, 2008, regarding U.S. Appl. No. 10/870,345, 12 pages.

Office Action, dated Sep. 9, 2008, regarding U.S. Appl. No. 10/870,345, 17 pages.

Final Office Action, dated Feb. 26, 2009, regarding U.S. Appl. No. 10/870,345, 22 pages.

Office Action, dated Jul. 1, 2008, regarding U.S. Appl. No. 10/870,346, 13 pages.

Final Office Action, dated Nov. 19, 2008, regarding U.S. Appl. No. 10/870,346, 18 pages.

\* cited by examiner

```
                                                      700
   702                                                 ⤶
     ⟍
     Object invoke (String wsdlLocation,⟋704
                    String operationName,⟋706
                    List params,⟝708
                    String username,⟝710
            712⟝String password)
                 throws WSDLException, WSIFException, IndexOutOfBoundsException;
```

*FIG. 7A*

```
String userid = "tioappadmin";
        String password = "tioappadmin";

String wsdlLocation =⟋740

"http://newpro8.torolab.ibm.com:9080/tcSoap/wsdl/com/thinkdynamics/ejb/dcm/inte
raction/DeviceComponentService.wsdl";

String operation = "reboot";⟝742
        List paramsList = new ArrayList ();
        String deviceId = "33333";⟝744
        paramsList.add(deviceId);⟝746 try {
          String requestId= (String)Invoker.invoke(wsdlLocation, operation,
paramsList, userid, password);
            }catch ( Exception e ) {
              e.printStackTrace();
            }
```

```
resourceProp = new Properties();
resourceProp.setProperty("tns:name", "IBM WAS Server");
                                                          ⎺⎺⎺
                                                          802 resourcePropertyDoc =
    ResourcePropertyUtil.convertToXML(resourceProp);
    ODIEndPointReference[] eprs =
        proxy.findReferencesByProperties(resourcePropertyDoc);
                    ⎺⎺⎺
                    804

((javax.xml.rpc.Stub)proxy.getCustomerService()).  ⎫
    _setProperty(WSAConstants.EPR, eprs[0]);       ⎬ 806
                                                   ⎭
             808
proxy.getResourceProperty("tns:identifier"));  ~ 810
proxy.getResourceProperty("tns:isFailed"));    ~ 812
proxy.getResourceProperty("tns:tcpPortNumber"));  ~ 814
proxy.getResourceProperty("tns:poolName"));    ~ 816 proxy.setMaintenance(true);  ~ 818
proxy.addServer();  ~ 820
```

```xml
<?xml version="1.0" encoding="UTF-8"?>
<wsdl:definitions targetNamespace="http://server.service.odi.tivoli.ibm.com"
        xmlns:wsdl="http://schemas.xmlsoap.org/wsdl/"
        xmlns:wsdlsoap="http://schemas.xmlsoap.org/wsdl/soap/"
        xmlns:xsd="http://www.w3.org/2001/XMLSchema">
<wsdl:types>
  <xsd:schema xmlns:xsd="http://www.w3.org/2001/XMLSchema"          ~1001
        xmlns:wsrp="http://www.ibm.com/xmlns/stdwip/web-services/ws-resourceProperties"
        targetNamespace="http://www.ibm.com/xmlns/stdwip/web-services/WS-ResourceProperties">
<schema elementFormDefault="qualified"
targetNamespace="http://server.service.odi.tivoli.ibm.com"
xmlns="http://www.w3.org/2001/XMLSchema"
xmlns:wsdl="http://schemas.xmlsoap.org/wsdl/"
xmlns:xsd="http://www.w3.org/2001/XMLSchema">
    <import namespace="http://resourcemodel.odi.tivoli.ibm.com"/>
    <!-- Common Resource property element declarations -->   ~1002
      <element name="identifier"  type="string"/>   ~1006
      <element name="globalIdentity" type="string" />
      <element name="name" type="string" />   ~1008
      <element name="type_server" type="int"/>
      <element name="resourceTypeId" type="int" />
      <element name="resourceTypeName" type="string" />
      <element name="resourceTypeDescription" type="string" />
      <element name="lockedUntil" type="date"/>
      <element name="deviceModelId" type="int" />
  <!-- Server Resource property element declarations -->  /-1004
      <element name="inMaintenance" type="boolean" />   ~1010
      <element name="isFailed" type="boolean"/>   ~1012
      <element name="isAssigned" type="boolean" />
      <element name="isDedicated" type="boolean" />
      <element name="tcpPortNumber" type="int" />
      <element name="ownerTypeId" type="int"/>
      <element name="bladSlotId" type="int" />
      <element name="poolName" type="string" />
      <element name="poolId" type="int" />
      <element name="clusterId" type="int"/>
      <element name="clusterName" type="string" />
      <element name="dedicatedClusterId" type="int" />
  <wsdl:message name="assignRequest">   ~1016
        <wsdl:part element="intf:assign" name="parameters"/>
  </wsdl:message>
  <wsdl:message name="assignResponse">   /-1018
        <wsdl:part element="intf:assignResponse" name="parameters"/>
  </wsdl:message>
                                               1022
  <wsdl:operation name="assign">
        <wsdl:input message="intf:assignRequest" name="assignRequest"/>
        <wsdl:output message="intf:assignResponse" name="assignResponse"/>
  </wsdl:operation>
    <wsdl: service name="ServerServiceService">  1024
      <wsdl:port binding="intf:ServerServiceSoapBinding" name="ServerService">
        <wsdlsoap:address
location="http://localhost:9080/odiWebServices/services/ServerService"/>
      </wsdl:port>
    </wsdl:service>
</wsdl:definitions>
```

1014 braces: assignRequest/assignResponse messages
1020 brace: assign operation
1026 brace: service block
1000

MANAGING DATA CENTER USING WEB SERVICES

CROSS REFERENCE TO RELATED APPLICATION APPLICATIONS

This application is a continuation of and claims the benefit of priority to U.S. patent application Ser. No. 10/870,345, filed Jun. 17, 2004 and entitled "Method and Apparatus for Managing Data Center Using Web Services. The present invention is related to the following application entitled "Method and Apparatus for Combining Resource Properties and Device Operations Using Stateful Web Services", U.S. patent application Ser. No. 10/870,346, filed Jun. 17, 2004. The above related applications are assigned to the same assignee, and are incorporated herein by reference.

This application is a continuation of application Ser. No. 10/870,345, filed Jun. 17, 2004, status pending.

BACKGROUND OF THE INVENTION

1. Technical Field

The present invention relates to an improved network data processing system. Particularly, the present invention relates to a method and apparatus for utilizing Web services in the network data processing system. Still more particularly, the present invention relates to a method and apparatus for using Web services to manage data center operations in the network data processing system.

2. Description of Related Art

In recent years, the use of Web services has increased due to the popularity of the World Wide Web. With Web services, businesses may perform transactions with consumers or other businesses. A service provider may publish available services on the Internet using Web services for an end user to subscribe. For example, a customer may subscribe to obtain stock quotes from a financial institution using Web services.

Web services are provided through a number of standards. An example of a Web services standard is Web Services Description language (WSDL). WSDL, a standard published by the World Wide Web Consortium (W3C), allows a service provider to describe Web services in an extensible markup language (XML) format as a set of endpoints operating on messages. WSDL allows endpoints and messages to be described regardless of the message formats or network protocols.

Another Web services standard is Web services invocation framework (WSIF). WSIF is an open application programming interface (API) for invoking Web services regardless of how the Web services are provided. Using WSIF, application developers may interact directly with abstract representations of Web services through their WSDL descriptions instead of using common message formats, such as Simple Object Access Protocol (SOAP). With these standards, Web services are widely used in electronic commerce and business-to-business applications.

Data centers, which connect a variety of servers and devices in different ways, are currently managed by administrators using legacy applications or manual operations. Many of these applications or operations are not extensible because they are platform and programming language dependent. In addition, no existing standard is present to define data center management.

Therefore, it would be advantageous to have a standard method that allows administrators to manage data centers regardless of languages and platforms. It would also be advantageous to have a method and apparatus that utilizes the benefits of Web services to facilitate communications between different types of servers and devices within a data center.

SUMMARY OF THE INVENTION

The present invention provides a method, apparatus, and computer instructions for managing data center using Web services. The mechanism of the present invention provides two types of Web services, stateless Web services and stateful Web services. Both of these types of Web services allow data center administrators to manage data center operations. Stateless Web services include an invoker application programming interface that utilizes a Web Services Invocation Framework (WSIF) to invoke data center operations. Stateful Web services include a WSDL definition file that is associated with each data center resource, which defines attributes of the resource and data center operations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7A is a diagram illustrating an exemplary implementation of the invoker API in accordance with a preferred embodiment of the present invention;

FIG. 7B is a diagram illustrating an exemplary implementation of a stateless Web service to reboot a switch is depicted in accordance with a preferred embodiment of the present invention;

FIG. 8 is a diagram illustrating an exemplary implementation of using a stateful Web service to invoke logical device operations and retrieve resource properties is depicted in accordance with a preferred embodiment of the present invention;

FIG. 10 is a diagram illustrating an exemplary WSDL file provided by the present invention in accordance with a preferred embodiment of the present invention;

DETAILED DESCRIPTION OF THE PREFERRED EMBODIMENT

Figure 1:
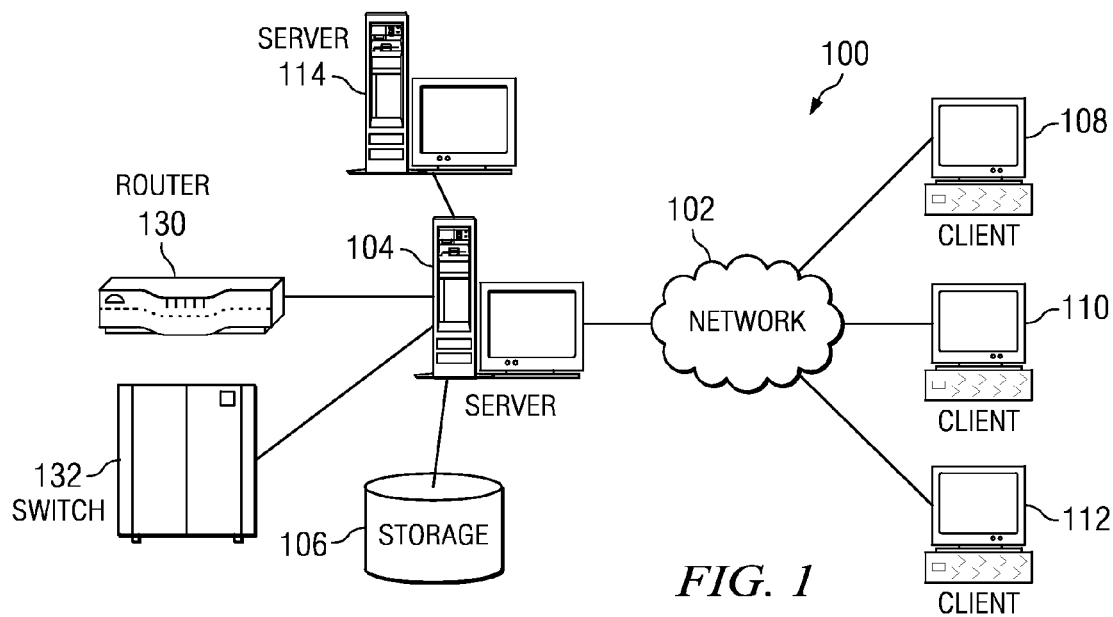
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

Furthermore, server 104 may be connected to other resources, such as router 130, server 114, switch 132 and storage 106. In the present invention, these resources in combination with network data processing system 100 make up a data center.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
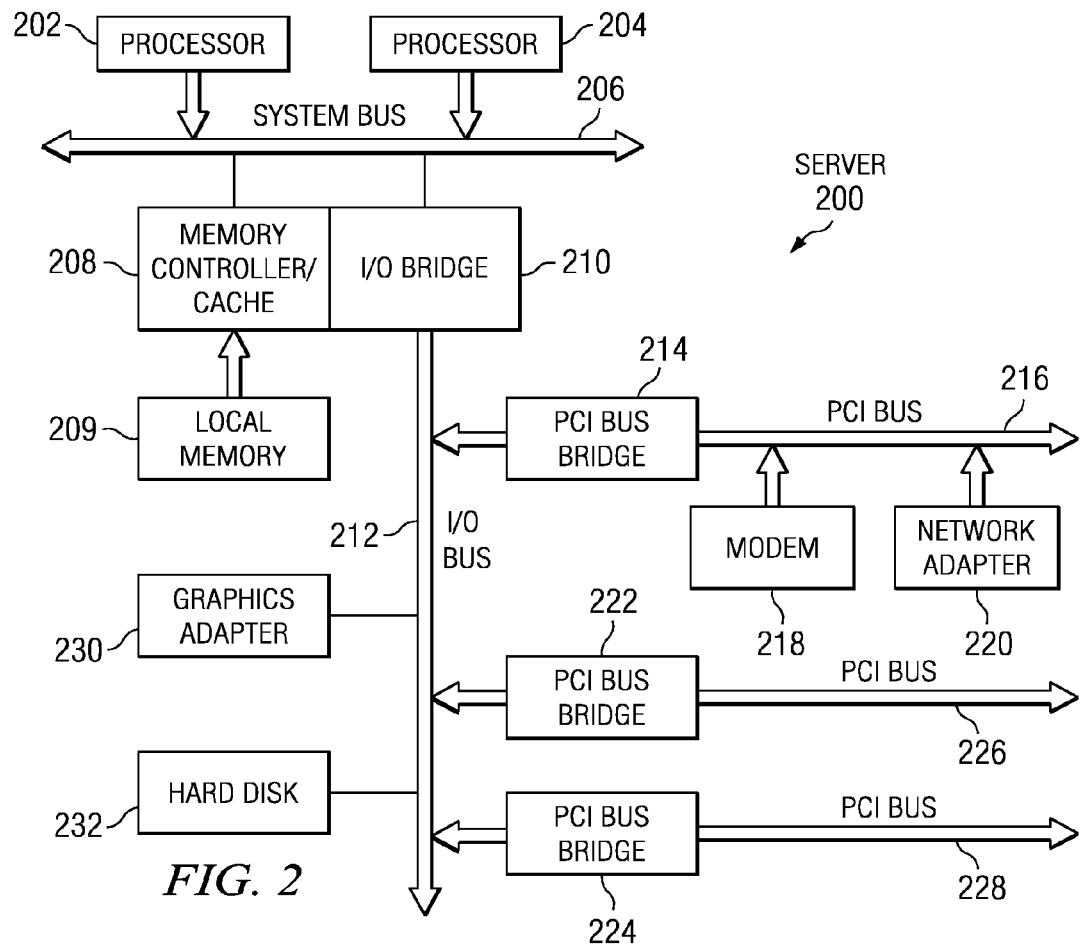
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
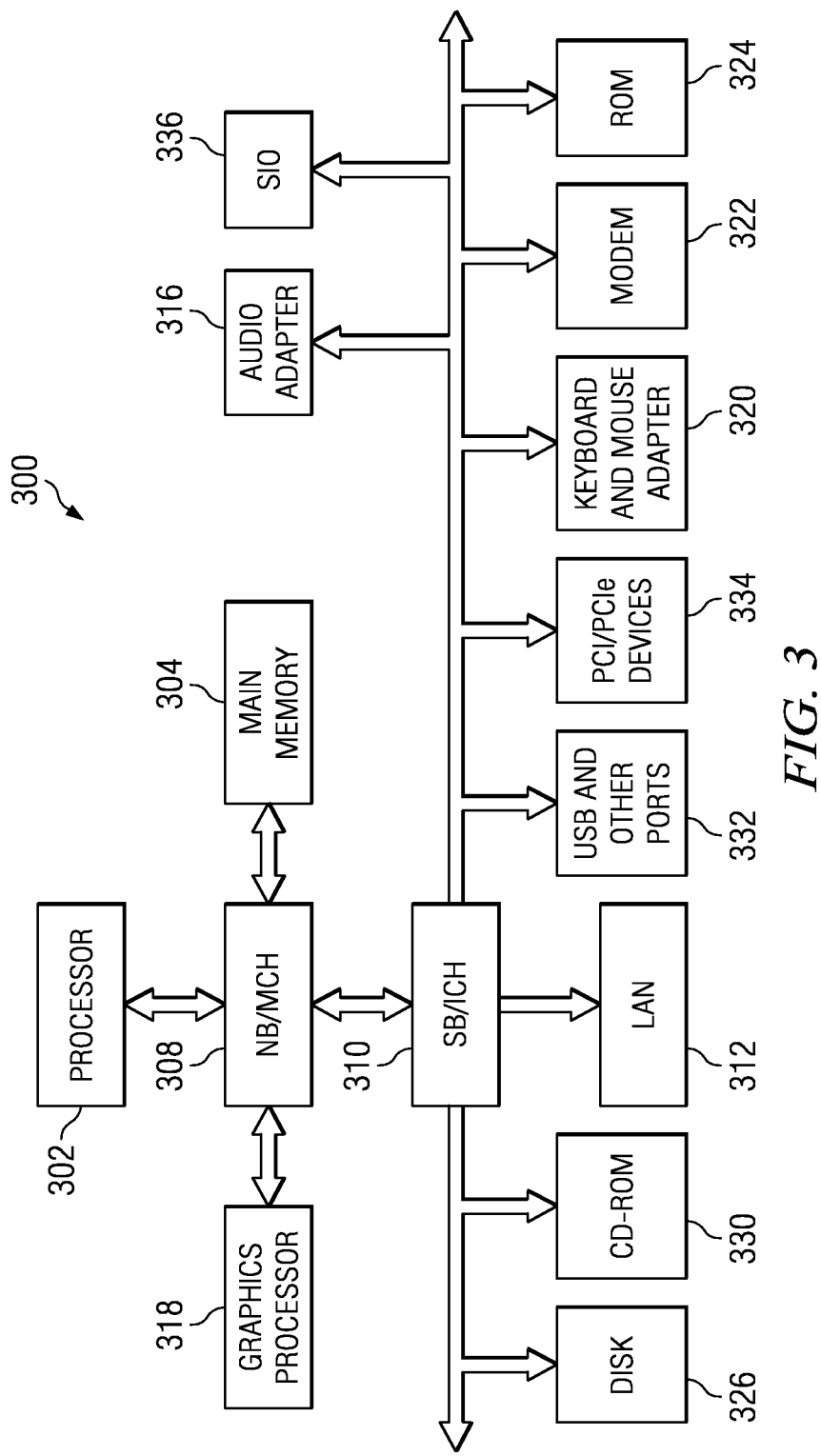
FIG. 3 is a block diagram of a data processing system in which the present invention may be implemented.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (TCH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention provides a method, apparatus, and computer instructions for managing data centers using Web services. A data center typically consists of many different types of servers and devices, such as routers and switches. By using Web services, data center operations and attributes associated with different resources may be defined in a WSDL definition file. Examples of data center operations include adding a server to a cluster of servers, removing a server from the cluster, and setting a server to maintenance mode. Some example resource attributes include server name, server id, and server type.

The administrator may use the WSDL definition file to invoke data center operations on logical device operations, which provides a high-level encapsulation to lower level operation scripts that manipulate data center resources. In this way, administrators may manage the data center without the constraints of different platforms or programming languages.

In a preferred embodiment, the present invention provides two mechanisms, stateless Web services and stateful Web services, for managing data center operations. Stateless Web services do not persist the state of resources. With this type of Web services, an administrator may only invoke a data center operation on a given resource, but may not persist the instance of the given resource for later use. The data center operations may be invoked using the Web services Invocation Framework (WSIF). On the other hand, stateful Web services allow administrators to persist an instance of a given resource to not only invoke data center operations on the resource, but also manipulate the attributes of the given resource and the resource's relationships with other resources.

The present invention provides stateless Web services for managing a data center through the use of an invoker application programming interface (API). An administrator, as a Web service user, may specify a number of input parameters for the invoke method of the invoker API to invoke a specific data center operation. The input parameters in the illustrative examples include a WSDL definition file location, the name of data center operation to be invoked, necessary parameters for the operation, a user name, and a password for accessing the data center resource. Invoker API utilizes the Web services Invocation Framework (WSIF) to invoke data center operations dynamically as specified in the WSDL file. Since stateless Web services do not persist the state of the resource, a resource id is required from the administrator each time an operation is invoked.

For stateful Web services, the present invention allows administrators to not only invoke data center operations on a given resource, but also manipulate the given resource and relationships between different resources. With stateful Web services provided by the present invention, an administrator may access an instance of a resource in the data center by requesting an endpoint reference for the given resource using a property, such as a resource name. As used herein, an endpoint reference is the end location of a particular resource, which is normally represented in the form of a Uniform Resource Identifier (URI) or a Uniform Resource Locator (URL). The administrator may then add the endpoint reference to a Simple Object Access Protocol (SOAP) header, such that the endpoint reference may later be used for subsequent requests. Once the endpoint reference is set, the resource is persistent within the scope of the Web services session. At this time, the administrator may retrieve or set any property associated with the resource and invoke logical device operations to manipulate that resource.

Figure 4:
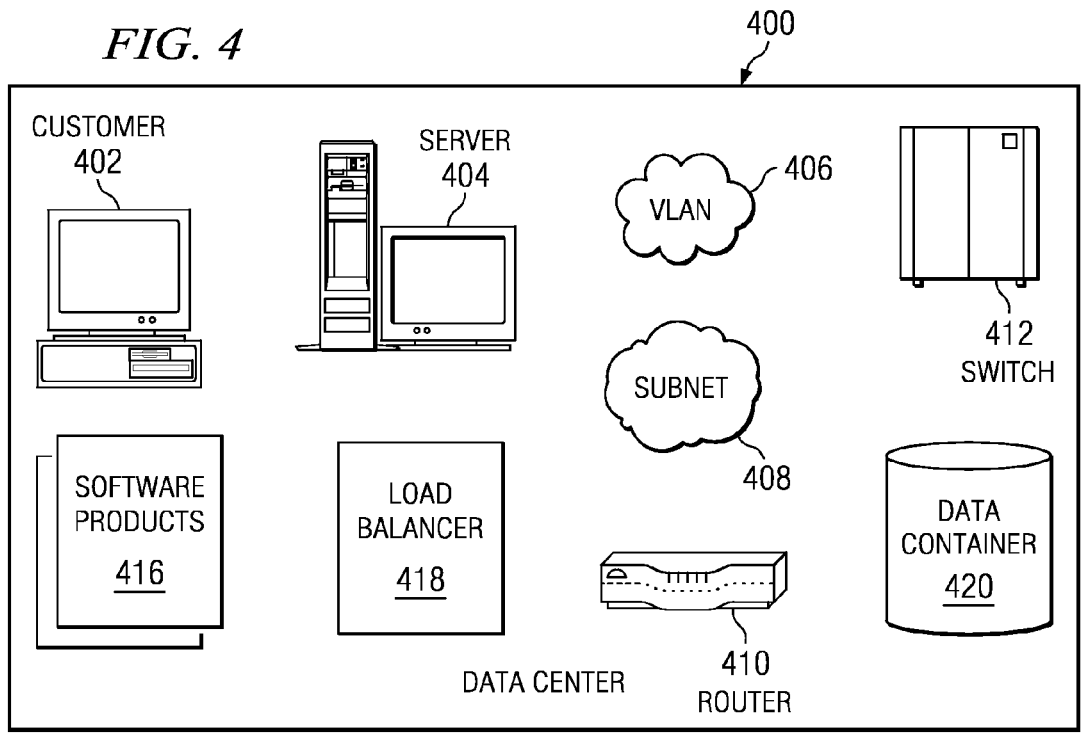
FIG. 4 is a diagram illustrating an exemplary data center in accordance with a preferred embodiment of the present invention.

Turning now to FIG. 4, a diagram illustrating an exemplary data center is depicted in accordance with a preferred embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 412 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be executed on a client or a server. Load balancer 418 spreads task among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, cluster of servers and switch port, also may be included in data center 400.

Figure 5:
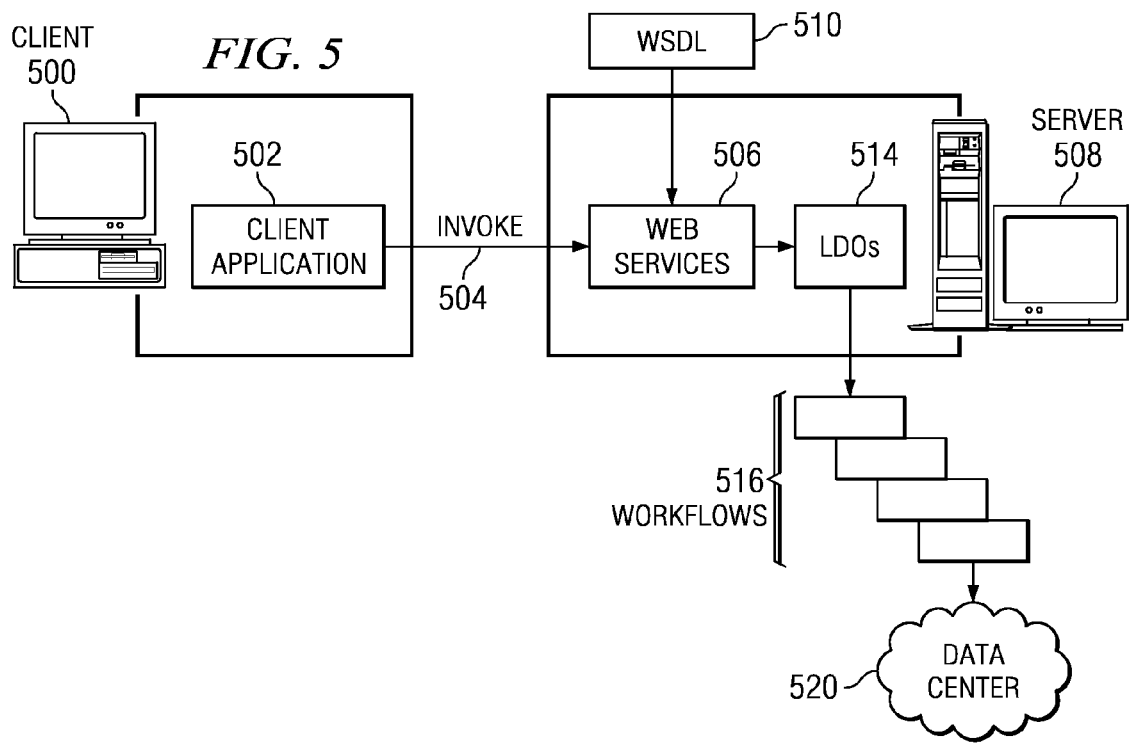
FIG. 5 is a diagram illustrating an exemplary invocation of a stateless Web service to manager a data center resource in accordance with a preferred embodiment of the present invention.

Turning now to FIG. 5, a diagram illustrating an exemplary invocation of a stateless Web service to manager a data center resource is depicted in accordance with a preferred embodiment of the present invention. As shown in FIG. 5, in this illustrative example, when client 500 wants to perform a data center operation on a resource, client 500 invokes client application 502, which may be a Web service interface, to call invoke method 504 of the invoker API provided by the present invention. The invoker API allows client 500 to invoke stateless Web services on server 508.

When calling invoke method 504, client 500 submits input parameters, which include the location of WSDL file 510, the desired operation name, parameters necessary for the operation, a user name and password for access to the resource.

WSDL file 510 defines resources, their attributes, and a set of operations that the data center administrator can perform on the resources.

Using the user name and password submitted by client 500, the identity of the administrator may be authenticated before access of data center resource is allowed. Once the identity of the administrator is authenticated, instance of the resource, Web service 506, is located using WSDL file 510 and logical data operation 514 is invoked by Web services 506 to run lower level workflow scripts 516. Workflow scripts 516 in turn perform data center operation on the resource in data center 520.

In this illustrative example, the present invention allows the administrator to invoke a stateless Web service to perform data center operation on a given resource. However, the administrator is unable to manipulate attributes of the given resource, since the state of the resource is not persistent.

Figure 6:
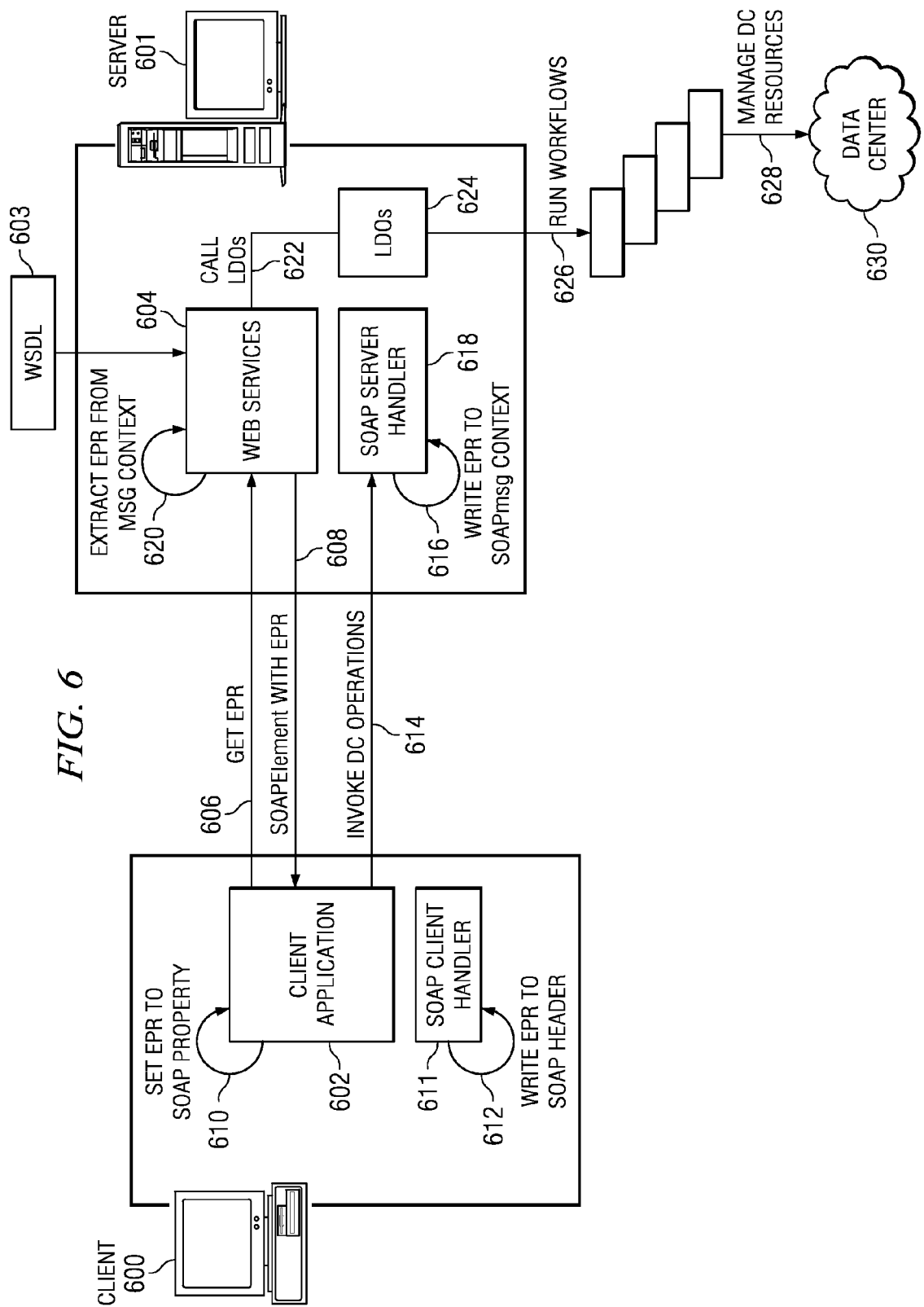
FIG. 6 is a diagram illustrating an exemplary invocation of a stateful Web service to manage a data center resource in accordance with a preferred embodiment of the present invention.

Turning now to FIG. 6, a diagram illustrating an exemplary invocation of a stateful Web service to manage a data center resource is depicted in accordance with a preferred embodiment of the present invention. As depicted in FIG. 6, in this illustrative example, when client 600 wants to invoke a data center operation on a resource, client 600 first invokes client application 602 to access an instance of this resource from server 601. Client application 602 accesses the instance by retrieving an endpoint reference of the resource from WSDL file 603 (call 606). The endpoint reference is retrieved by using a resource property, such as a server name. Once the instance of the resource, Web services 604, is accessed, the endpoint reference is returned to client application 602 in a SOAP element (call 608).

When the endpoint reference is received by client application 602, client application 602 sets the endpoint reference in a property of the SOAP stub (call 610). In addition, SOAP client handler 611 sets the endpoint reference to the SOAP message header, such that subsequent requests through the stub may re-use the same endpoint reference (call 612). Once the endpoint reference is set in the SOAP header, the resource is now persistent within the scope of the current Web services session and client 600 may access the instance of the resource to invoke a data center operation or retrieve properties for the resource (call 614).

After a data center operation is invoked by client 500 via client application 602, SOAP server handler 618 writes the endpoint reference to a SOAP message context (call 616) for Web services 604 to extract (call 620). When the endpoint reference is extracted, a resource id is retrieved from the message context which identifies a particular resource in the data center to invoke the operation on. After the resource id is retrieved, Web services 604 calls logical device operations 624, which is a high-level encapsulation of lower level workflow scripts to perform a specific data operation (call 622). The logical device operations 624 run lower level workflows scripts (call 626) to manage resource of data center 630 accordingly (call 628).

Thus, using the stateful Web services, an administrator is able to access the instance of a given resource, such that the administrator may create or destroy the instance at any time. In addition, the administrator also may retrieve or set attributes for the given resource, interrogate relationships associated with the given resource and invoke data center operations on the given resource. Furthermore, there is no need for the client to submit a resource ID each time, as in the case of stateless Web services, as an input parameter to the Web service, because the state of the resource is now persistent.

Turning now to FIG. 7A, a diagram illustrating an exemplary implementation of the invoker API is depicted in accordance with a preferred embodiment of the present invention. As shown in FIG. 7A, in this illustrative example, the invoker API 700 includes an invoke method 702, which takes in five input parameters: wsdlLocation 704, operationName 706, params 708, username 710, and password 712.

WsdlLocation 704 defines the WSDL file location for the Web service that is to be invoked by the client. OperationName 706 defines the name of the data center operation to be invoked. Params 708 defines one or more parameters to be passed into the operation. Username 710 and password 712 define the userid and password required for authentication of an administrator in order to access the data center resource. Thus, using invoke method 702 of the invoker API 700, an administrator may dynamically invoke data center operations on a given resource.

Turning now to FIG. 7B, a diagram illustrating an exemplary implementation of a stateless Web service to reboot a switch is depicted in accordance with a preferred embodiment of the present invention. As shown in FIG. 7B, in this illustrative example, an administrator specifies the location of the WSDL file 740 in a URL or URI format.

The administrator then specifies the operation as a "reboot" operation 742 and a device id of "33333" 744 to be included in the list of parameters 746 for the "reboot" operation. Once the input parameters are set, the administrator then invokes the invoke method, such as invoke method 702 in FIG. 7A, and passes in the input parameters.

In this illustrative examples the administrator wants to reboot a switch with a device id of "33333". By specifying the WSDL file location directly, the present invention allows the operation to be invoked on a specific switch.

Turning now to FIG. 8, a diagram illustrating an exemplary implementation of using a stateful Web service to invoke logical device operations and retrieve resource properties is depicted in accordance with a preferred embodiment of the present invention. As shown in FIG. 8, in this illustrative example, client application 800 may query a server for an endpoint reference of a desired resource. A server name of "IBM WAS Server" 802 is used. The endpoint reference is retrieved by invoking a findReferenceByProperties method 804. Next, the client adds the endpoint reference to a SOAP header by setting the endpoint reference in the property of the SOAP stub 806. Once the endpoint reference is set in the SOAP header, the administrator may access the server resource instance and retrieve attributes of the resource accordingly.

In this illustrative example, the administrator accesses the attributes by invoking a getResourceProperty method 808 to retrieve the server identifier 810, isFailed 812, the TCP port number 814, and the pool name 816. In addition to retrieving the attributes, the administrator may also set attributes, define relationships between this resource and other resources, and invoke logical device operations to physically manipulate the server resource in the data center.

In this depicted example, the administrator may set the server resource's maintenance mode to true by invoking a setMaintenance method 818, which means no one has access to the server resource other than the administrator. The administrator also adds the server resource to a cluster by invoking the addServer method 820. At any time, the administrator may query the status of a request by invoking a getRequestStatus method to determine whether the Web service session should be terminated or whether to destroy the instance of the server resource.

Figure 9:
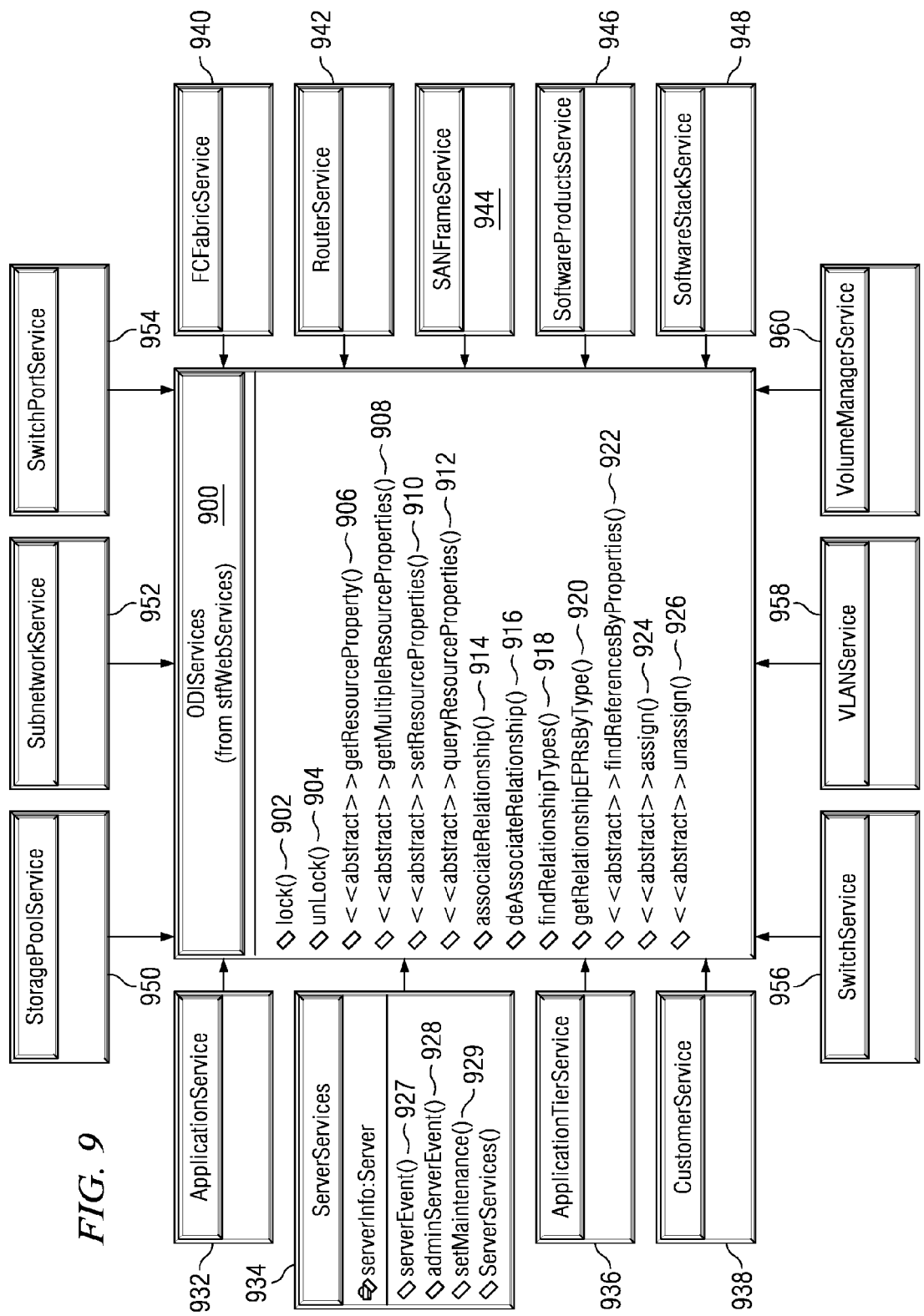
FIG. 9 is a class diagram illustrating available Web services resources in accordance with a preferred embodiment of the present invention.

Turning now to FIG. 9, a class diagram illustrating available Web services resources is depicted in accordance with a preferred embodiment of the present invention. As depicted in FIG. 9, On demand infrastructure (ODI) services are web services and infrastructures that support business on demand in an enterprise computing environment, ODI service class 900 is a base class that includes a number of default methods. These methods include lock 902, unlock 904, get resource property 906, get multiple resource properties 908, set resource properties 910, query resource properties 912, associate relationship 914, de-associate relationship 916, find relationship types 918, get relationship endpoint reference (EPR) by type 920, find references by properties 922, assign 924 and unassign 926.

ODI service 900 is inherited by a number of subclasses, which are available resources in the data center. These resources include Application service 932, server service 934, application tier service 936, customer service 938, fibre channel (FC) fabric service 940, router service 942, storage area network (SAN) frame service 944, software products service 946, software stack service 948, storage pool service 950, sub-network service 952, switch port service 954, switch service 956, VLAN service 958 and volume manager service 960, Application service 932 provides Web services operations to manipulate the application resource of the data center and server service 934 provides Web services operations to manipulate the server resource of the data center, etc.

Services 932-960 inherit default methods 902-926 from ODI service 900, such that an administrator may manipulate services 932-960 once an instance of the resource is obtained. For example, lock method 902 allows the administrator to lock a resource. Unlock method 904 allows the administrator to unlock the resource.

Get resource property method 906 allows the administrator to retrieve an attribute of a resource by the property name, for example, NumberOfBlocks. Get multiple resource properties method 908 retrieves the value of an attribute by a list of property names, for example, NumberOfBlocks and Size. Set resource properties 910 sets a number of attributes by inputting an XML string. Query resource properties method 912 allows an administrator to query attributes by specifying a condition. For example, an administrator may NumberOfBlocks>20 and BlockSize=1024. Associate relationship method 914 associates two resources with a given relationship type and de-associate relationship method 916 undo the association. For example, a customer resource may be associated with an application resource with a relationship type of "OWN", since the customer may own an application.

Find relationship types method 918 finds relationship types for a given resource based on all possible relationship types for the resource regardless of whether or not the relationship types are associated with other resources. Get relationship EPR by type method 920 gets the relationship endpoint references by type. Find references by properties method 922 finds the list endpoint references that are associated with a given resource properties. This is the method invoked by the administrator in order to access an instance of a resource. Assign method 924 assigns and unassign method 926 unassigns a given resource to an application. Thus, default methods 902-926 enable the administrator to manipulate the attributes of data center services using properties specified the WSDL definition file.

In addition to default methods 902-926 inherited from ODI service 900, server service 934 also includes customized methods, such as server event 927, admin server event 928, and set maintenance 929. Server event method 927 allows an administrator to set the server failure status to either true or false. Admin server event 928 allows the administrator to set the admin server failure status to either true or false. Set maintenance method 929 allows the administrator put a server resource in maintenance mode by setting it to true or take a server resource out of maintenance mode by setting it to false. As to application tier service 936, customized methods, such as allocate server and remove server are provided for an administrator to add a server to or remove a server from a cluster.

In this manner, the present invention provides a set of Web services that allows the administrator to manipulate attributes of any given resource in a data center. Other resources may also be provided by inheriting ODI service 900.

Turning now to FIG. 10, a diagram illustrating an exemplary WSDL file provided by the present invention is depicted in accordance with a preferred embodiment of the present invention. As depicted in FIG. 10, WSDL file 1000 adheres to the standard of Web Services Definition Language (WSDL). In the schema section 1001, a number of common 1002 and server resource properties 1004 are defined. Common resource properties are shared by all data center resources and server resource properties are specific to a server resource. Examples of common property include an identifier 1006 and a name of the resource 1008. Examples of server resource properties include isMaintenance 1010 and isFailed 1012.

In addition to resource properties, the schema section of WSDL file 1000 also defines a number of data elements that will be used by WSDL messages. Subsequent to the schema section, a number of WSDL message definitions 1014 are provided to define data elements of data center operation. Each message includes one or more parts. A message can be compared to an input or output of a function, which contains one or more parts, which are input or output parameters. Examples of messages include 'assign request' 1016 and 'assign response' 1018. Each message represents an input and output of the 'assign' operation.

After the messages are defined, a set of operations are defined using the defined messages. For example, operation 'assign' 1020 is defined with an input of 'assign request' 1022 and an output of 'assign response' 1024. Operation 'assign' may be compared to a function of a program in traditional programming, except in this example, 'assign' is an operation provided by a resource, such as a server resource. These operations represent default methods and customize methods as described in FIG. 9. Once operations are defined, WSDL file 1000 defines a Web service to include all defined operations. In this example, 'server service service' 1026 is defined to include the operations.

Figure 11:
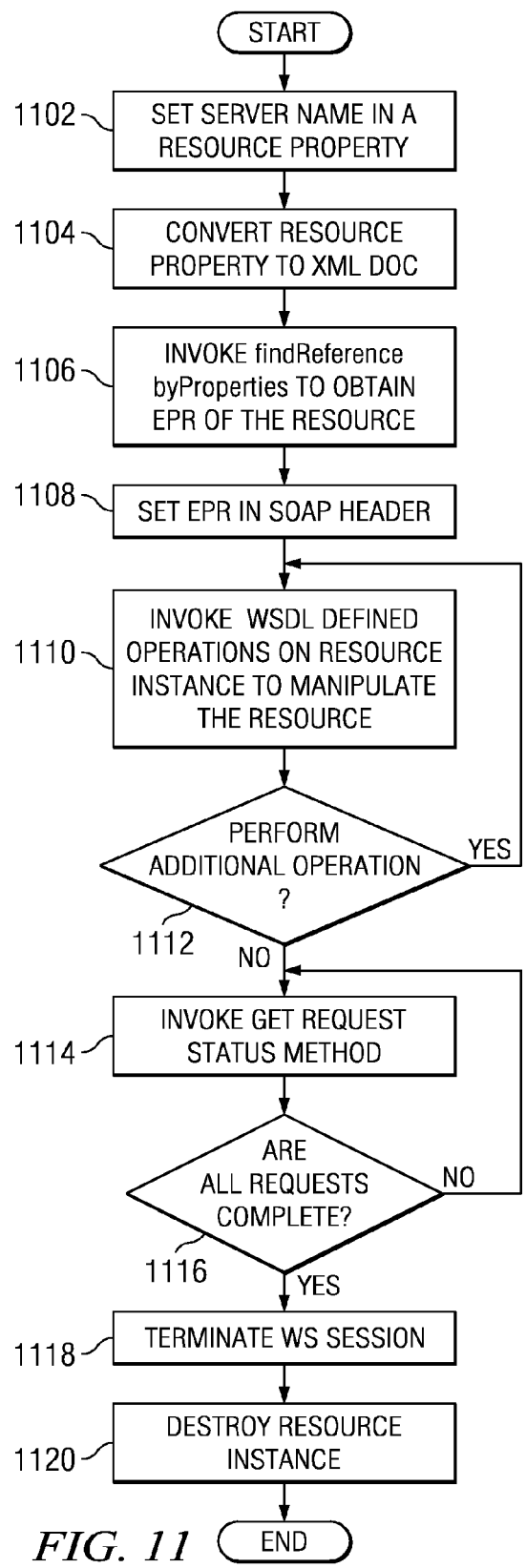
FIG. 11 is a flowchart of a process for using stateful Web services to manage data center resource from a client's perspective in accordance with a preferred embodiment of the present invention.

Turning now to FIG. 11, a flowchart of a process for using stateful Web services to manage data center resource from a client's perspective is depicted in accordance with a preferred embodiment of the present invention. As depicted in FIG. 11, in this illustrative example, a client wants to access a server resource from the data center. The process begins when the client application sets a server name in a resource property (step 1102). The client application may use any resource property to obtain an endpoint reference. However, since a server name is unique to each server, using the server name property will locate only a single server from the data center. Next, the client application converts the resource property to an XML string (step 1104).

Once the resource property is converted, the client application invokes the findReferenceByProperties method to obtain endpoint reference of the server resource (step 1106). After the EPR is obtained, the client application sets the EPR in the SOAP header for future use (step 1108). The server resource is now persistent within the scope of the Web services session and the client application may access the instance throughout the resource lifecycle.

The client application may invoke operations that are defined in the WSDL file, such as WSDL file 900 in FIG. 9, to manipulate the server resource (step 1110). Examples of data center operations include add a server to a cluster, remove a server from a cluster, and set the server maintenance mode to true. The client application also may retrieve or set a number of server resource attributes, such as server identifier and server type. Once the operation is complete, a determination is then made by the client application as to whether to perform additional operations (step 1112). If additional operations are to be performed, the client application returns to step 1110 to invoke another WSDL defined operations to further manipulate the resource.

If no additional operations are to be performed, the client application invokes the get request status method (step 1114) and make a determination as to whether all outstanding requests are complete (step 1116). If all requests are complete, the client application terminates the current Web services session (step 1118) and destroys the resource instance (step 1120). Thus, the process terminates thereafter. Otherwise, the process returns to step 1116 until all outstanding requests are complete.

Figure 12:
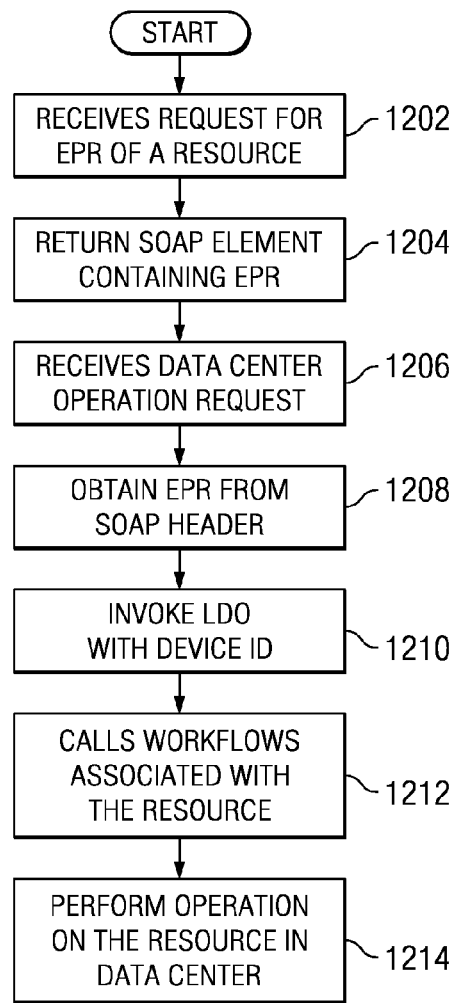
FIG. 12 is a flowchart of a process illustrating an exemplary process of using stateful Web services to manage data center resource from a server's perspective in accordance with a preferred embodiment of the present invention.

Turning now to FIG. 12, a flowchart of a process illustrating an exemplary process of using stateful Web services to manage data center resource from a server's perspective is depicted in accordance with a preferred embodiment of the present invention. As depicted in FIG. 12, in this depicted example, the process begins when server, such as server 601 in FIG. 6, receives a request from the client for an endpoint reference of a resource (step 1202). The server returns a SOAP element with an endpoint reference for the desired resource (step 1204). Later, the server receives a data center operation request on the resource (step 1206). The server then obtains the endpoint reference from the SOAP header (step 1208) and invokes the logical device operation (LDO) with a device ID (step 1210).

The LDO provides a high level view of device operations that a client can run. For example, a 'cluster.AddServer' LDO provides a base interface that the client can use to add a server to a cluster. The server then calls workflows associated with the particular resource (step 1212). Workflows provide detail implementation of the base interface. A client may associate a LDO with workflows for a given device or resource. When the client invokes an LDO with a device ID, as in this example, the server determines which workflows are associated with the LDO. In the present invention, a workflow may call other workflow to perform specific operations. Each workflow also contains low level scripts that are used to manipulate the data center. Finally, the server calls a workflow for the device to perform operation on the resource in the data center (step 1214) with the process terminating thereafter.

In summary, the present invention provides a platform and language independent method for managing data centers by using Web services. The present invention recognizes the deficiencies of current solutions for managing data centers and provides both stateless and stateful Web services solutions. With the use of stateful Web services, an administrator may use a standard Web services interface to remotely access a resource in a data center without accessing the actual device. With the benefits of Web services standards, such as WSDL, the present invention enables the administrator to manage resources of the data center more efficiently, because the administrator may use different types of Web based applications, such as hypertext markup language (HTML) and Java server pages (JSP), to access the resource. Furthermore, stateful Web services provide the administrator a way to manage resources based on a specific resource instance. The present invention may also define how long a client or administrator may access a particular resource instance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a data center, the method comprising:
   receiving a user input to invoke an operation on a resource in the data center, wherein the user input identifies the operation and a Web service for performing the operation, wherein the user input includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
   initiating the operation on the resource in the data center using the Web service identified in the user input.

2. The method of claim 1, wherein the Web service is a stateless Web service in which an identification of a resource is required each time a selected operation is invoked on the resource.

3. The method of claim 1, wherein the Web service is a stateful Web service in which an identification of the resource is persisted for subsequent invocation of operations on the resource.

4. The method of claim 1, wherein the user input is received at an interface for the Web service.

5. The method of claim 1, wherein the user input includes an identification of the Web service description language file and wherein the initiating step includes:

invoking the operation on the resource in a manner specified in the Web service description language file.

6. The method of claim 1, wherein resources in the data center includes at least one of a server, a cluster of servers, and a virtual local area network.

7. The method of claim 1, wherein resources in the data center further includes at least one of a switch, a router, a balancer, software products, and a data container.

8. A method for performing operations on a resource in a data center, the method comprising:
    detecting a request to invoke an operation on the resource in the data center from a data processing system, wherein the request includes an identification of a Web service, wherein the request further includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
    invoking the operation from a plurality of logical device operations to perform a logical device operation on the resource using the identification of the Web service.

9. The method of claim 8, wherein the identification of the Web service is an endpoint reference of the Web service.

10. The method of claim 8, wherein the Web services description language file further defines attributes and operations of the resource in the data center.

11. The method of claim 8, wherein the plurality of logical device operations includes adding a server resource to a cluster, removing a server resource from a cluster, setting the resource in maintenance, associating the resource with another resource, and disassociating the resource from another resource.

12. The method of claim 8, wherein invoking the operation from the plurality of logical device operations includes invoking workflows associated with the resource, and wherein the workflows includes low level scripts that physically manipulate the resource in the data center.

13. A data processing system for managing a data center, the data processing system comprising:
    receiving means for receiving a user input to invoke an operation on a resource in the data center, wherein the user input identifies the operation and a Web service for performing the operation, wherein the user input includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
    initiating means for initiating the operation on the resource in the data center using the Web service identified in the user input.

14. The data processing system of claim 13, wherein the Web service is a stateless Web service in which an identification of a resource is required each time a selected operation is invoked on the resource.

15. The data processing system of claim 13, wherein the Web service is a stateful Web service in which an identification of the resource is persisted for subsequent invocation of operations on the resource.

16. The data processing system of claim 13, wherein the user input is received at an interface for the Web service.

17. A data processing system for performing operations on a resource in a data center, the data processing system comprising:
    detecting means for detecting a request to invoke an operation on the resource in the data center from a data processing system, wherein the request includes an identification of a Web service, wherein the request further includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
    invoking means for invoking the operation from a plurality of logical device operations to perform a logical device operation on the resource using the identification of the Web service.

18. The data processing system of claim 17, wherein the identification of the Web service is an endpoint reference of the Web service.

19. The data processing system of claim 17, wherein the Web services description language file further defines attributes and operations of the resource in the data center.

20. The data processing system of claim 17, wherein the plurality of logical device operations includes adding a server resource to a cluster, removing a server resource from a cluster, setting the resource in maintenance, associating the resource with another resource, and disassociating the resource from another resource.

21. The data processing system of claim 17, wherein invoking means includes means for invoking workflows associated with the resource, and wherein the workflows includes low level scripts that physically manipulate the resource in the data center.

22. A computer program product in a computer readable storage device for managing a data center, the computer program product comprising:
    first instructions for receiving a user input to invoke an operation on a resource in the data center, wherein the user input identifies the operation and a Web service for performing the operation, wherein the user input includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
second instructions for initiating the operation on the resource in the data center using the Web service identified in the user input.

23. The computer program product of claim 22, wherein the Web service is a stateless Web service in which an identification of a resource is required each time a selected operation is invoked on the resource.

24. The computer program product of claim 22, wherein the Web service is a stateful Web service in which an identification of the resource is persisted for subsequent invocation of operations on the resource.

25. The computer program product of claim 22, wherein the user input is received at an interface for the Web service.

26. The computer program product of claim 22, wherein the second instructions includes:
sub-instructions for invoking the operation on the resource in a manner specified in the Web service description language file.

27. The computer program product of claim 22, wherein resources in the data center includes at least one of a server, a cluster of servers, and a virtual local area network.

28. The computer program product of claim 22, wherein resources in the data center further includes at least one of a switch, a router, a balancer, software products, and a data container.

29. A computer program product in a computer readable storage device for performing operations on a resource in a data center, the computer program product comprising:
first instructions for detecting a request to invoke an operation on the resource in the data center from a data processing system, wherein the request includes an identification of a Web service, wherein the request further includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and
second instructions for invoking the operation from a plurality of logical device operations to perform a logical device operation on the resource using the identification of the Web service.

30. The computer program product of claim 29, wherein the identification of the Web service is an endpoint reference of the Web service.

31. The computer program product of claim 29, wherein the Web services description language file further defines attributes and operations of the resource in the data center.

32. The computer program product of claim 29, wherein the plurality of logical device operations includes adding a server resource to a cluster, removing a server resource from a cluster, setting the resource in maintenance, associating the resource with another resource, and disassociating the resource from another resource.

33. The computer program product of claim 29, wherein the second instructions includes sub-instructions for invoking workflows associated with the resource, and wherein the workflows includes low level scripts that physically manipulate the resource in the data center.

34. A data processing system comprising:
a bus system;
a memory connected to the bus system, wherein the memory includes a set of instructions; and
a processing unit connected to the bus system, wherein the processing unit executes a set of instructions to receive a user input to invoke an operation on a resource in the data center, wherein the user input identifies the operation and a Web service for performing the operation, wherein the user input includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and initiate the operation on the resource in the data center using the Web service identified in the user input.

35. A data processing system comprising:
a bus system;
a memory connected to the bus system, wherein the memory includes a set of instructions; and
a processing unit connected to the bus system, wherein the processing unit executes a set of instructions to detect a request to invoke an operation on the resource in the data center from a data processing system, wherein the request includes an identification of a Web service, wherein the request further includes the operation name, operation parameters, and a Web service description language file location that identifies a Web service description language file, wherein the Web service description language file defines a set of operations and a set of messages, wherein each message is defined as an input or an output of at least one operation in the set of operations, wherein the Web service description file further defines common resource properties and server resource properties, wherein the common resource properties are used by all resources in the data center, and wherein the server resource properties are specific to server resources; and invoke the operation from a plurality of logical device operations to perform a logical device operation on the resource using the identification of the Web service.

* * * * *